(12) United States Patent
Simone (10) Patent No.: US 7,878,879 B2
(45) Date of Patent: Feb. 1, 2011

(54) GAME CALL ASSEMBLY

(76) Inventor: Anthony Simone, 17 Thomas Maria Cir., Webster, NY (US) 14580

( * ) Notice: Subject to any disclaimer, the term of this patent is extended or adjusted under 35 U.S.C. 154(b) by 548 days.

(21) Appl. No.: 11/852,780

(22) Filed: Sep. 10, 2007

(65) Prior Publication Data

US 2008/0057823 A1 Mar. 6, 2008

Related U.S. Application Data

(63) Continuation-in-part of application No. 11/118,128, filed on Apr. 29, 2005, now abandoned.

(51) Int. Cl.
*A63H 5/00* (2006.01)
*A63H 33/00* (2006.01)
(52) U.S. Cl. ...................... 446/397; 446/418
(58) Field of Classification Search .......... 446/397, 446/418, 419, 212, 216, 484; 43/1, 2
See application file for complete search history.

(56) References Cited

U.S. PATENT DOCUMENTS

| 5,402,102 | A | * | 3/1995 | Lachance | .................. 340/404.1 |
| 5,555,664 | A | | 9/1996 | Shockley | |
| 5,975,978 | A | | 11/1999 | Hall | |
| 6,514,116 | B2 | | 2/2003 | Abbas | |

\* cited by examiner

*Primary Examiner*—Kien T Nguyen
(74) *Attorney, Agent, or Firm*—Thomas R. FitzGerald, Esq.; Hiscock & Barclay, LLP (57) ABSTRACT

A game call assembly for attracting wild game comprises a game call configured for emitting a call when rotated to an inverted position. A motor when energized rotates a shaft. The game call is coupled to the shaft. A switch selectively electrically connects a power source to the motor. The game call assembly is configured for being mounted to a weapon, and also functions as a stabilizer.

16 Claims, 8 Drawing Sheets

GAME CALL ASSEMBLY

CROSS-REFERENCE TO RELATED APPLICATIONS

This application is a continuation-in-part of U.S. Utility patent application Ser. No. 11/118,128, filed Apr. 29, 2005, the disclosure of which is herein incorporated by reference.

FIELD OF THE INVENTION

The present invention relates to a game call assembly that emits sound for attracting wildlife.

BACKGROUND OF THE INVENTION

Numerous devices are known in the relevant art for use by hunters and others, such as photographers, for producing game sounds intended to be heard by wild game for the purpose of attracting the wild game to the source of the game sound. Such devices are collectively known as game calls and are available in various configurations. Some game calls, for example, are actuated by air and include a reed or other sound-producing member. In order to issue a call, a hunter must blow or otherwise force air into and/or through such an air-actuated game call device. Other types of calls may, for example, require a hunter to strike an object against the calling device or to strike the calling device against an object. Each of these prior art calls has certain disadvantageous features and/or aspects.

Producing a realistic game call by blowing air through an air-actuated or reed-type game call device is an art, and is not a particularly repeatable process. Thus, since the amount and velocity of air traveling through a reed-type game call device determines at least in part the characteristics and sound level of the call, a user must be well practiced in order to produce calls having realistic characteristics, such as the proper duration and sound level. The volume produced by such calls can vary widely and from user to user, and an excited hunter may inadvertently produce a call that is too loud or not loud enough. Too loud of a call may scare away the game the call was intended to attract. A call that requires one or more hands to actuate may result in a hunter or photographer missing a rare opportunity to photograph or take aim at the attracted game as a result of having to move his or her hands from the game call to the camera or weapon. Further, a user is typically forced to keep track of where the call device is kept, such as, for example, in which pocket, and may fumble and/or drop the call device when retrieving it for use.

Some game call devices have been developed that address, to a certain extent, the above-mentioned disadvantageous characteristics. Some call devices have been developed that do not require a user to hold the device and/or actuate the device by hand. For example, some air-actuated calls are configured for having a mouthpiece attached or otherwise held proximate to or within the mouth of a user, and thus do not require a user to raise and hold the call tip to his or her mouth by hand. However, such calls still require the user to force air through the device and thus retain the above-described associated disadvantages. Other calls have been developed which do not require a user to force air through the device and, therefore, produce more repeatable and realistic calls. For example, electronic calls have been developed which produce the call via electronic and/or amplified means. However, many states have by law declared the use of such electronic and/or amplified call devices illegal, particularly when used by hunters.

Therefore, what is needed in the art is a game call device which does not require handling and/or hand actuation by a user.

Furthermore, what is needed in the art is a game call device which is configured for being readily available to a user.

Moreover, what is needed in the art is a game call device which produces calls at consistent and/or repeatable sound levels but which is not an amplified call device.

SUMMARY OF THE INVENTION

The present invention provides a game call assembly for attracting wild animals and game.

The present invention comprises, in one form thereof, a game call operable to emit a call by reorienting the game call from an upright position to an inverted position. The game call is coupled to the shaft of a motor. A switch selectively electrically connects a power source to the motor thereby energizing the motor, rotating the shaft, and inverting the game call. The game call assembly is configured for being mounted to a weapon, and also functions as a stabilizer.

An advantage of the present invention is that a user can actuate the game call without moving from a ready-to-fire position.

A further advantage of the present invention is that the call is issued at a relatively consistent sound level.

A still further advantage of the present invention is that it is not an amplified call and thus does not run afoul of laws precluding the use of such amplified calls.

BRIEF DESCRIPTION OF THE DRAWINGS

The present invention is disclosed with reference to the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
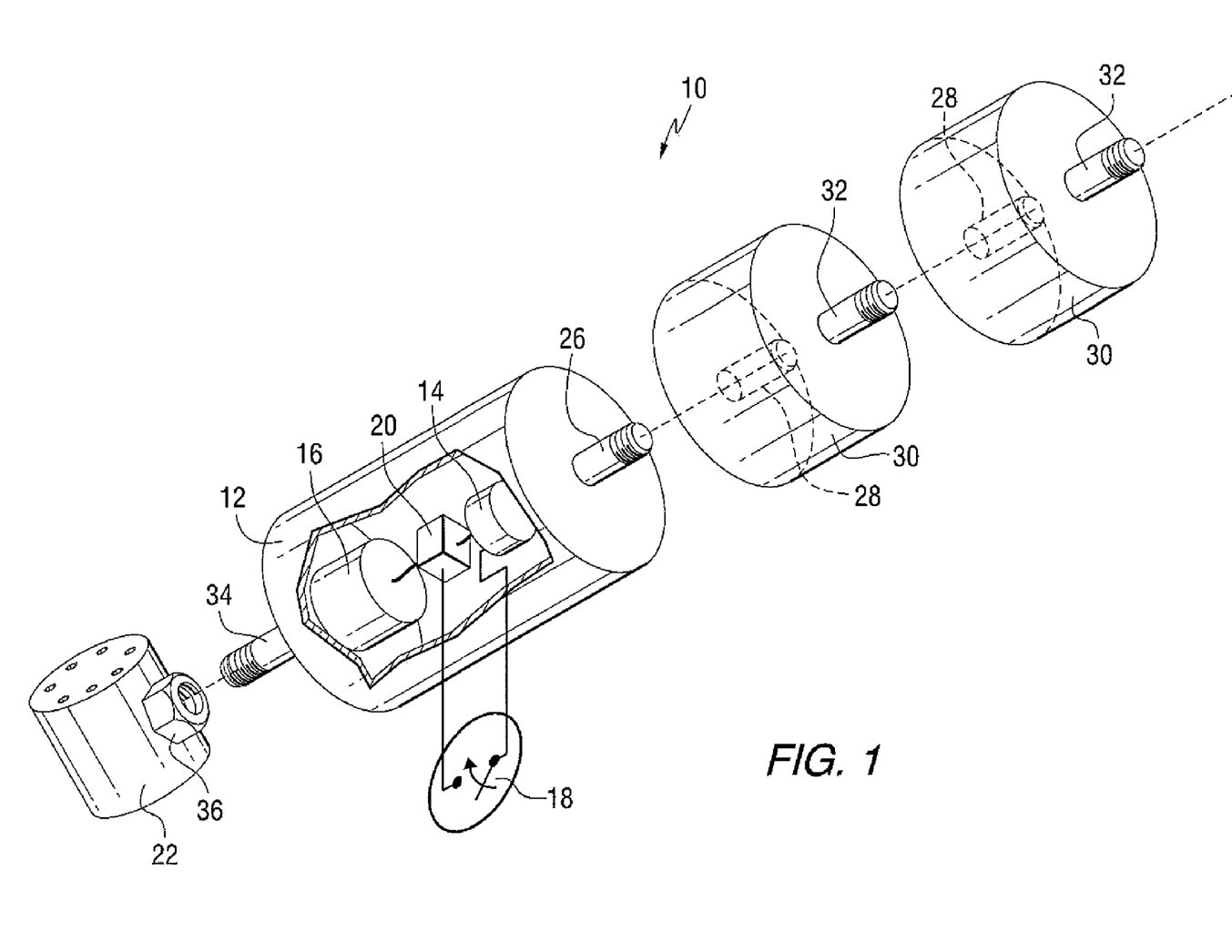
FIG. 1 is an exploded view of one embodiment of a game call assembly of the present invention.

Referring now to FIG. 1, one embodiment of a game call assembly of the present invention is shown. Game call assembly 10 includes housing 12, power source 14, motor 16, switch 18, controller 20, and game call 22.

Housing 12 is a compact generally cylindrical housing that defines an interior space (not referenced) in which power source 14, motor 16 and controller 20 are disposed. The interior of housing 12 is preferably sealed against intrusion by the elements and constructed of a material that is relatively lightweight yet durable. Housing 12 also encloses, receives, or has affixed thereto one or more weights or weighted sections which as will be more particularly described hereinafter, enable game call assembly 10 to additionally function as a stabilizing element.

Still referring to FIG. 1, housing 12 includes a first housing feature 26, such as, for example, a threaded stud, configured for engaging either of: 1) a first weighted-section feature 28, such as, for example, a threaded bore, of one or more weighted sections 30; or 2) a similar accessory-mounting feature of a second object, such as, for example, a weapon, (neither of which are shown in FIG. 1) as is more particularly described hereinafter. The weighted sections 30 further include a second weighted-section feature 32, such as, for example, a threaded stud, configured for engaging a first weighted-section feature 28 of another weighted section 30 or the accessory-mounting feature of a weapon.

Power source 14, such as, for example, a conventional battery, provides power to controller 20 and motor 16. Motor 16 is, preferably, an electrical motor, such as, for example, a direct current motor, stepper motor, or other similar motor, which when energized is configured to rotate shaft 34 thereof in a predetermined direction. Switch 18 is a conventional switch that actuates, via controller 20, motor 16. Switch 18 is physically positioned in a location that allows convenient actuation and requires minimum movement by a user, as will be more particularly explained hereinafter.

Controller 20 controls the amount or degree to which shaft 34 is rotated for each actuation of switch 18. Thus, for each actuation of switch 18 shaft 34 is rotated a predetermined amount or number of degrees, such as, for example, 180 degrees (one-hundred eighty degrees). Controller 20 is, for example, an electronic controller that issues to motor 16 an electrical signal or pulse having a fixed duration or a predetermined number of pulses that cause shaft 34 to rotate by the predetermined amount or degree. Such controllers are well known in the art. Controller 20 can be alternately configured, such as, for example, as a simple mechanical resettable stop or other suitable means that limits rotation of shaft 34.

Game call 22 is similar to an estrus or can-type bleat call or other similar call. The bleat mimics a female deer in heat. Bow hunters use this device to stop a male deer. Often a bow hunter comes upon a make deer that is moving. When a male deer hears the bleat of the deer call, he often stops moving to investigate the sound. Other audible calls are used to attract different game. For example, a coyote is often attracted by a call that mimics a rabbit in distress. Wild turkeys are attracted by artificial mating calls. Conventional estrus-type calls emit a call when a hole in the bottom thereof is plugged, typically by a user covering the hole with a finger, and the can is inverted or turned end-to-end by the user. Game call 22 is modified, relative to a conventional estrus or can-type bleat call, so as to not have a bottom hole or with any bottom hole being either permanently sealed or selectively sealed by a sealing member when ready for use (to thereby avoid inadvertent calls). Game call 22 includes a mounting feature 36, such as, for example, a threaded socket integral with and/or affixed thereto, configured to attach to shaft 34.

Figure 2:
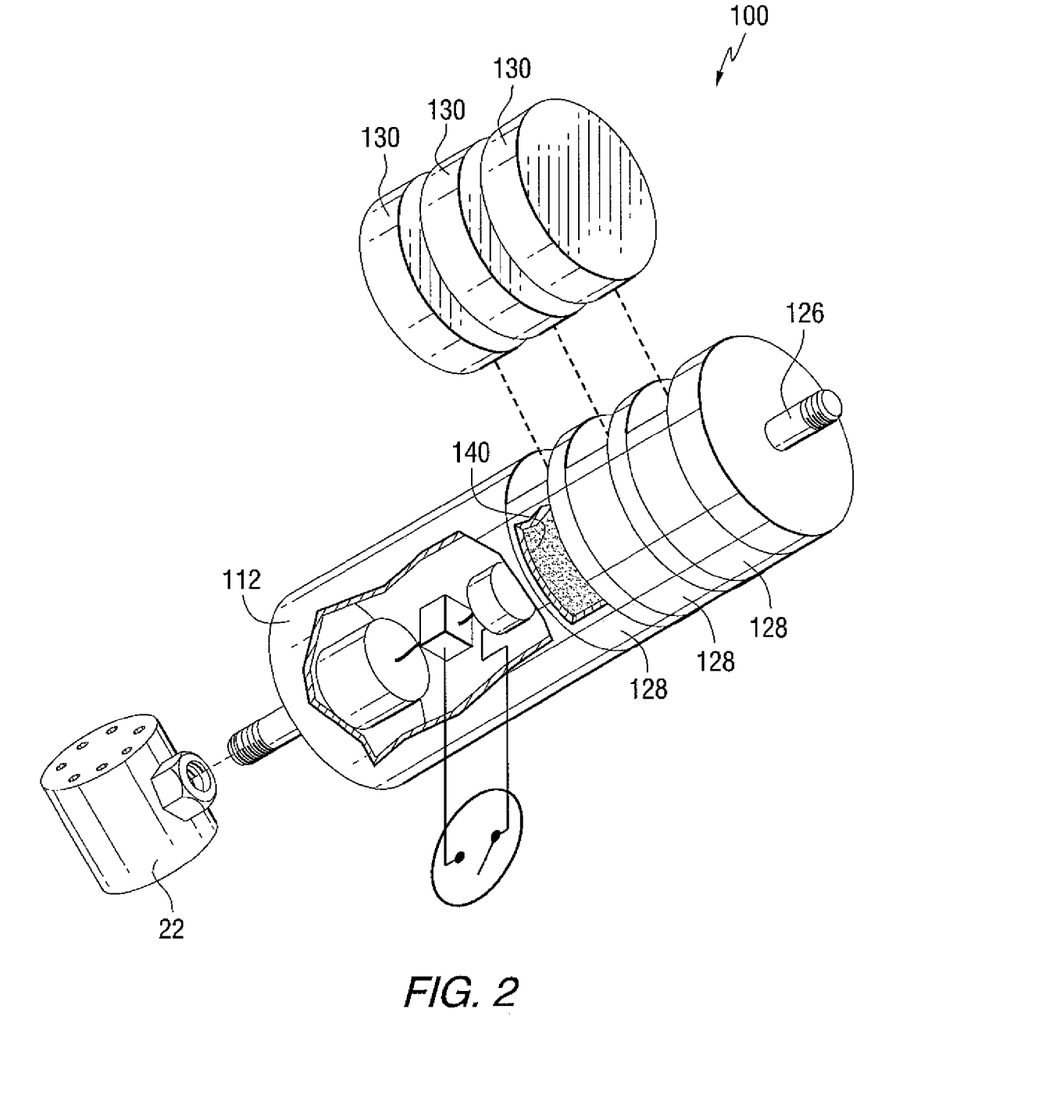
FIG. 2 is an exploded view of another embodiment of a game call assembly of the present invention.

Referring now to FIG. 2, a second embodiment of a game call assembly of the present invention is shown. Game call assembly 100 includes housing 112 having a first housing feature 126, such as, for example, a threaded stud, configured for engaging a similar feature of a second object, such as, for example, a weapon, (not shown in FIG. 2) as is more particularly described hereinafter. Housing 112 further includes weight-receiving housing features 128, such as, for example, molded plastic slots or receptacles, for securely receiving and removably retaining weights or weight sections 130. Weight-receiving housing features 128 are configured to hold weight sections 130 in a substantially stationary maimer, thereby substantially reducing if not eliminating noise-producing movement or rattling of weight sections 130 when disposed within weight-receiving housing features 128. Optionally, weight-receiving housing features 128 are lined with a gasket-type member 140, such as, for example, a rubber or felt material.

Figure 3A:
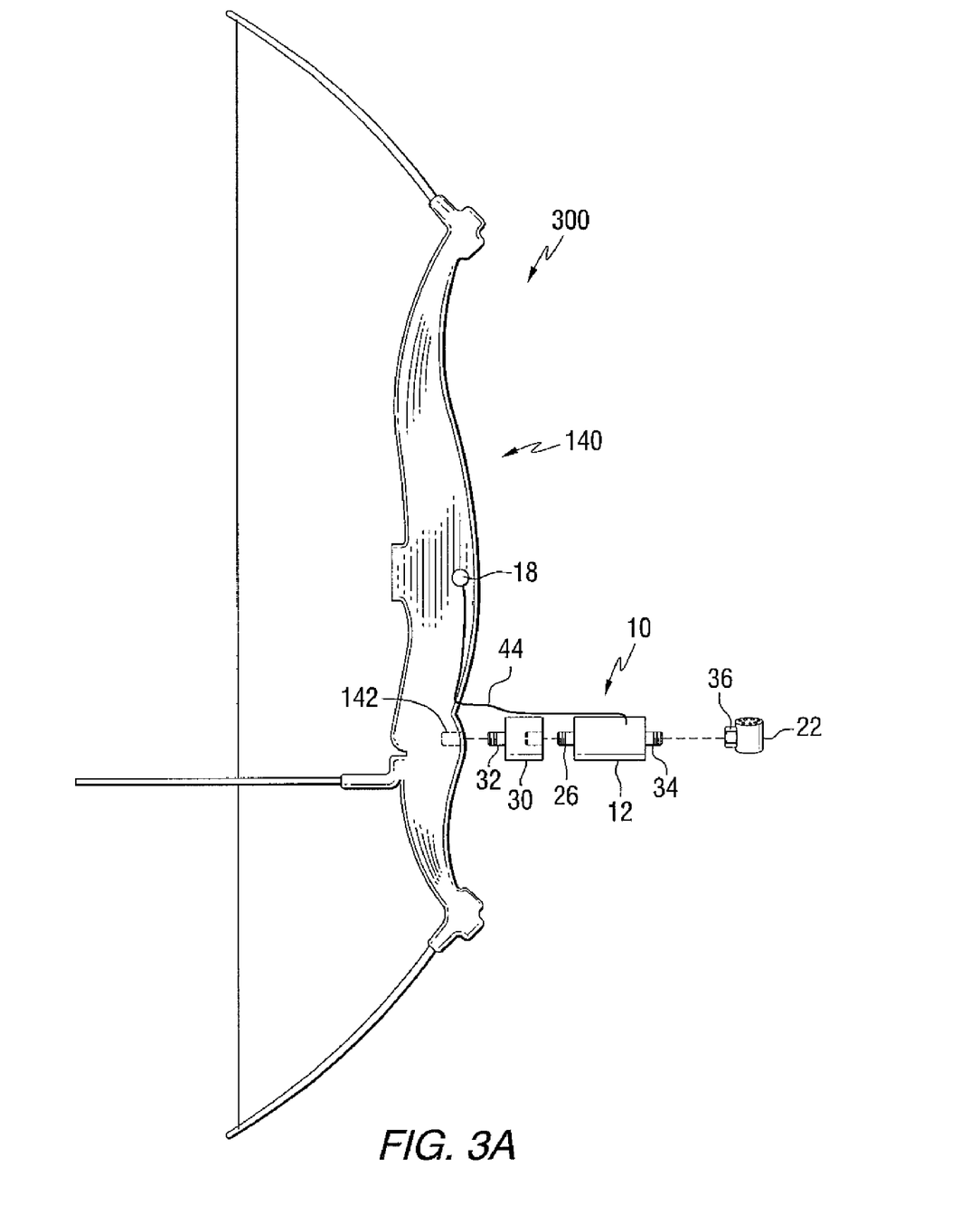
FIGS. 3A, 3B and 3C are perspective views of the game call assembly of FIGS. 1 and 2 mounted to an archery bow, cross bow, and rifle, respectively.
Figure 3B:
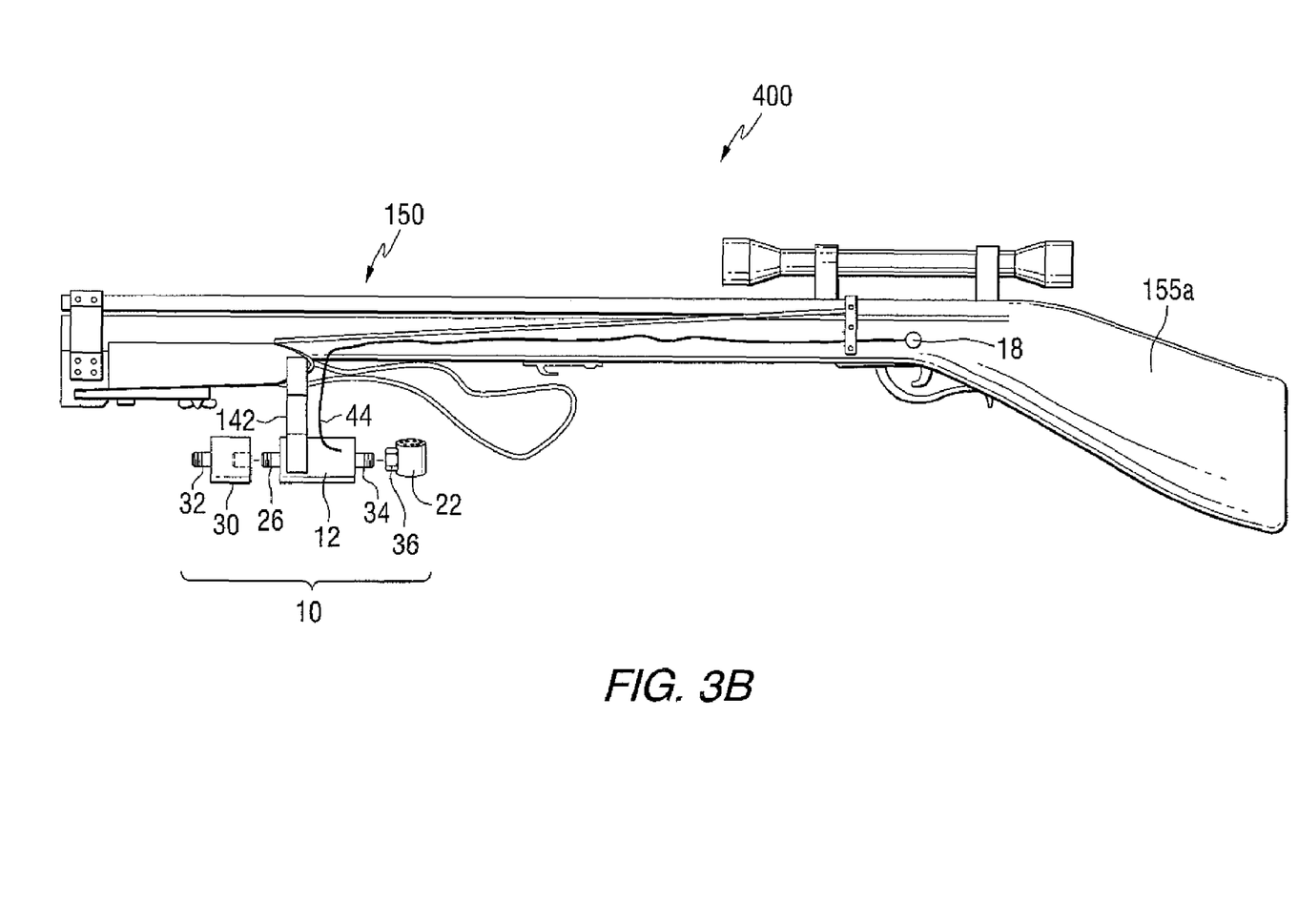
Figure 3C:
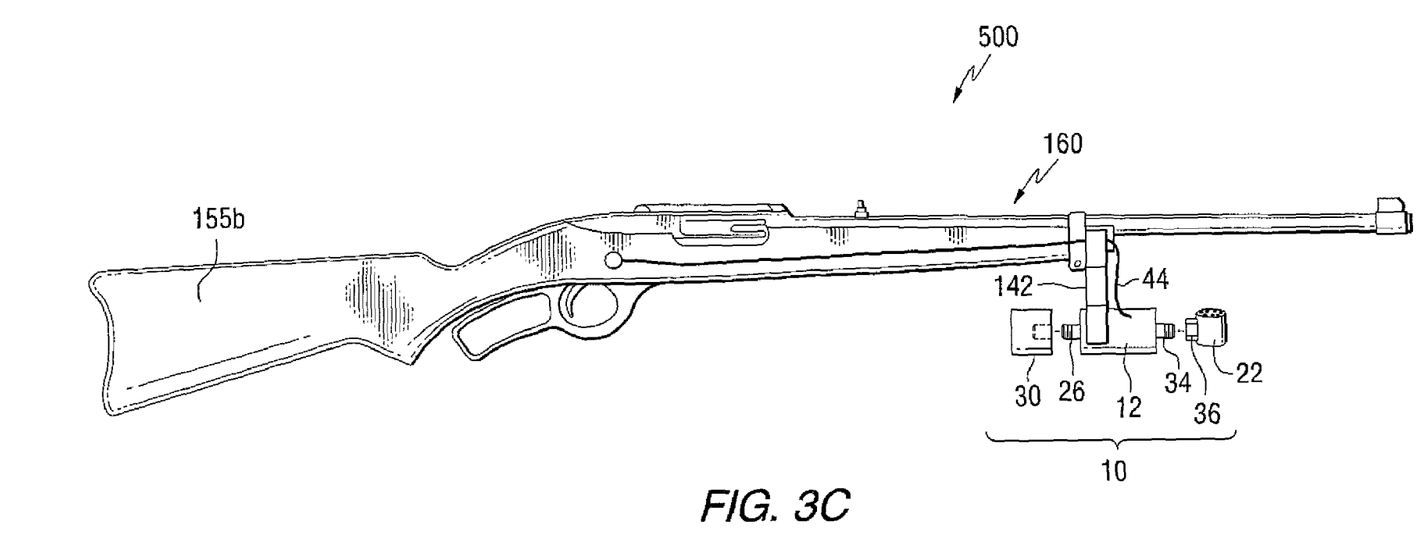

Referring now generally to FIGS. 3A-3C, game call assembly 10 is shown affixed to various weapons to function as a game call assembly and, optionally, a stabilizer. Stabilizers are used on weapons, particularly by archers on their bows, and are intended to reduce torque and shock. Stabilizers also help to level out the weapon and hold the weapon steady while aiming, and may reduce noise produced by the weapon.

Referring now to FIG. 3A, game call assembly 10 is shown mounted and/or affixed to an archery bow 140 to thereby form weapon assembly 300. More particularly, game call device 22 is affixed to housing 12 via the engagement of shaft 34 of motor 16 with mounting feature 36 of game call device 22. One or more weighted sections 30 (only one shown in FIG. 3A) are coupled to housing 12 via the engagement of first housing feature 26 and first weighted-section feature 28.

Switch 18 is preferably mounted proximate the ready-to-fire hand position of the user of bow 140, cross bow 150 and/or firearm 160 such that the user can actuate switch 18 without moving his or her hand from that position. Preferably, switch 18 is a low-profile switch, such as, for example, a membrane or micro switch. Wires 44 that electrically connect switch 18 between power source 14 and motor 16 are routed along and periodically affixed to structural members of bow 40.

FIGS. 3B and 3C show game call assembly 10 and/or 100 mounted and/or installed, in a substantially similar manner to that described above in regard to bow 140, to cross bow 150 and firearm 160 to form weapon assemblies 400 and 500, respectively. For the cross bow 400 and the rifle 500, a bracket 142 clips or otherwise attaches to the stock 155a, 155b of the cross bow or the rifle, respectively. The bracket 142 is disposed at a location convenient for the hunter to operate the switch 18. The bracket has a threaded receiver bore (not shown) that receives the threaded stud on the end of the call apparatus. The bracket may be positioned anywhere along the length of the stock, preferably at a location where the switch 18 can be conveniently actuated with the user's index finger on the user's hand that supports the stock 155a, 155b. Hunting rifle 500 has a similar bracket 142 for mounting the call on the stock 155b below the barrel 160.

Figure 4:
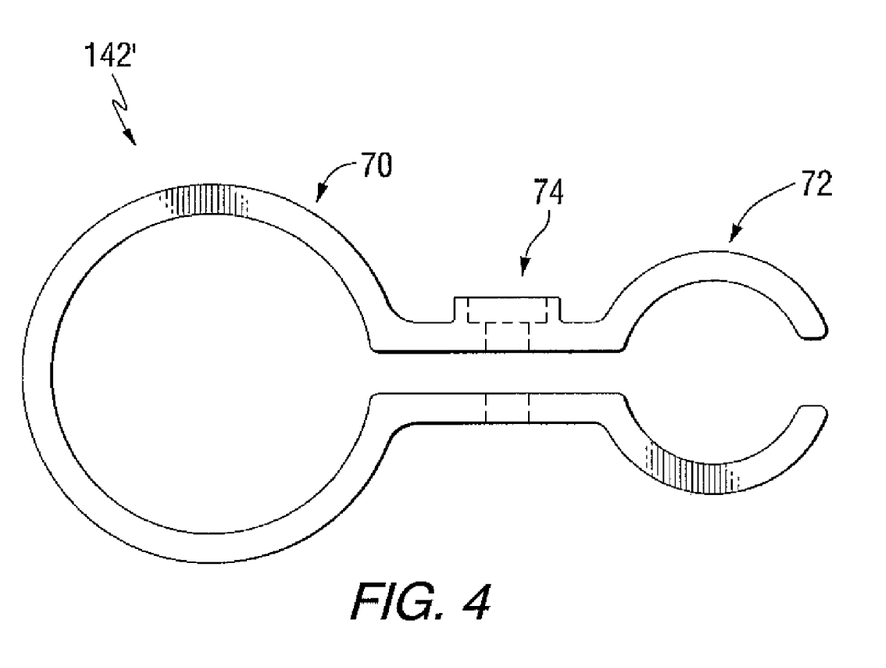
FIG. 4 is a side view of a bracket for mounting the game call assembly to a second object such as a rifle.

Alternatively, the game call assembly 10 or 100 is affixed to a rifle or other weapon by bracket 142', shown in FIG. 4. The bracket 142' includes a weapon receiving end 70, a game call assembly receiving end 72, and a clamping means 74. The weapon receiving end 70 slides onto the barrel or other cylindrical component of a weapon and the game call assembly receiving end 72 engages the game call assembly. The clamping means 74 may include a screw threaded between two walls of the bracket 142' to be operable to pull the walls together upon tightening of the screw to thereby clamp the weapon receiving end 70 onto the weapon and the game call assembly receiving end 72 onto the housing of the game call assembly. A break in the wall in the weapon receiving end 70, the game call assembly receiving end 72, or both allows the walls to be pulled closer together and clamp onto the weapon and the game call assembly.

It should be particularly noted that in weapon assemblies 400 and 500 shaft 34 of game call assembly 10 is oriented generally parallel to a central axis (not shown) thereof, so that it maintains the same relative orientation as the call on the weapon assembly 300, to thereby orient game call device 22 for proper operation. The particular game call requires such orientation, but those skilled in the art understand that other embodiments of the game calls could be made if different orientations are desired.

Figure 5A:
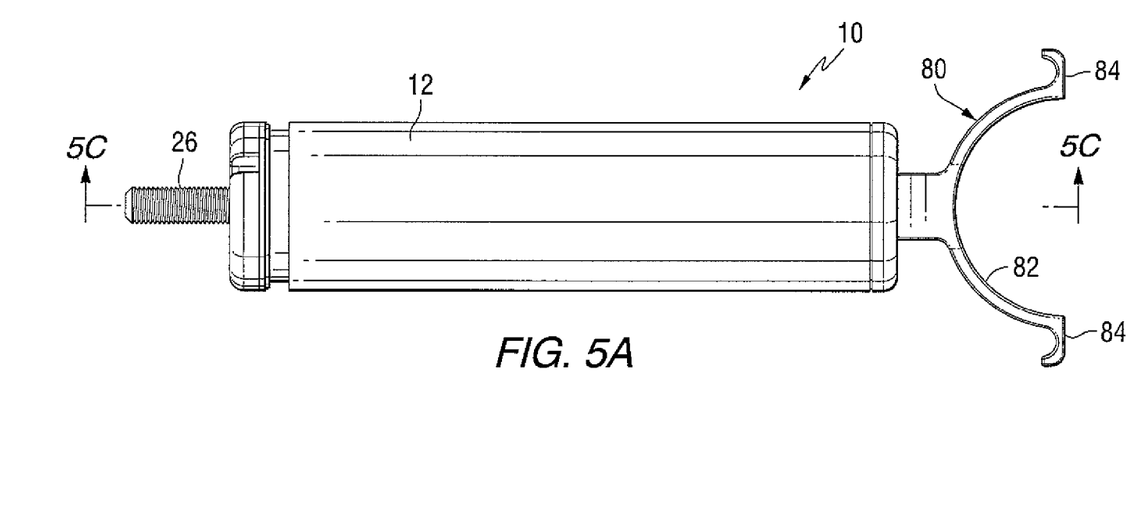
FIGS. 5A and 5B are, respectively, a side view and an end view of an embodiment of the game call assembly having a game call mounting bracket.
Figure 5B:
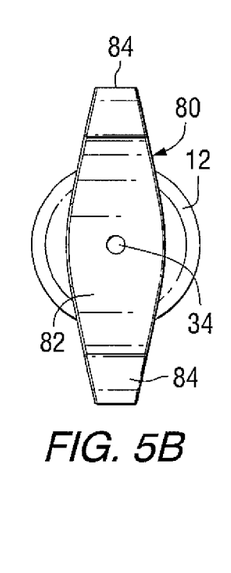
Figure 5C:
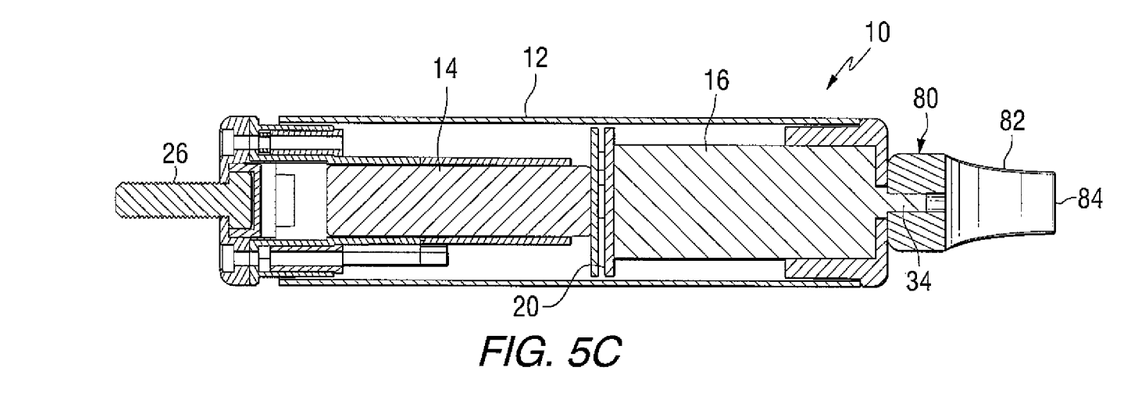
FIG. 5C is a cross-sectional view of the game call assembly of FIG. 5A taken at line 5C-5C.

In a particular embodiment shown in FIGS. 5A-5C, the game call assembly 10 includes a game call mounting bracket 80 affixed to and rotatable with the shaft 34. The bracket 80 includes a curved portion 82, which is shaped to receive a variety of different game calls. Particularly, game calls will generally have a cylindrical shape; however, game calls may vary in size and shape. The curved portion 82 will accommodate a variety of different sizes and shapes. The game call mounting bracket 80 further includes a pair of opposing hooks 84, which allow the game call to be secured or strapped to the bracket simply by hooking an elastic band, string, or the like onto hooks 84 around the game call.

In the embodiment shown, wires 44, which electrically connect switch 18 between power source 14 and motor 16, are routed along and periodically affixed to structural members of the weapon with which game call assembly 10 is used. However, it is to be understood that the game call assembly of the present invention can be alternately configured, such as, for example, with wires embedded and/or integrated into the structural members of the weapon. Similarly, switch 18 can be alternately configured as a radio-frequency, infra-red, or other type of actuation device which does not require a direct connection by wire, so long as controller 20 is also correspondingly alternately configured.

Figure 6:
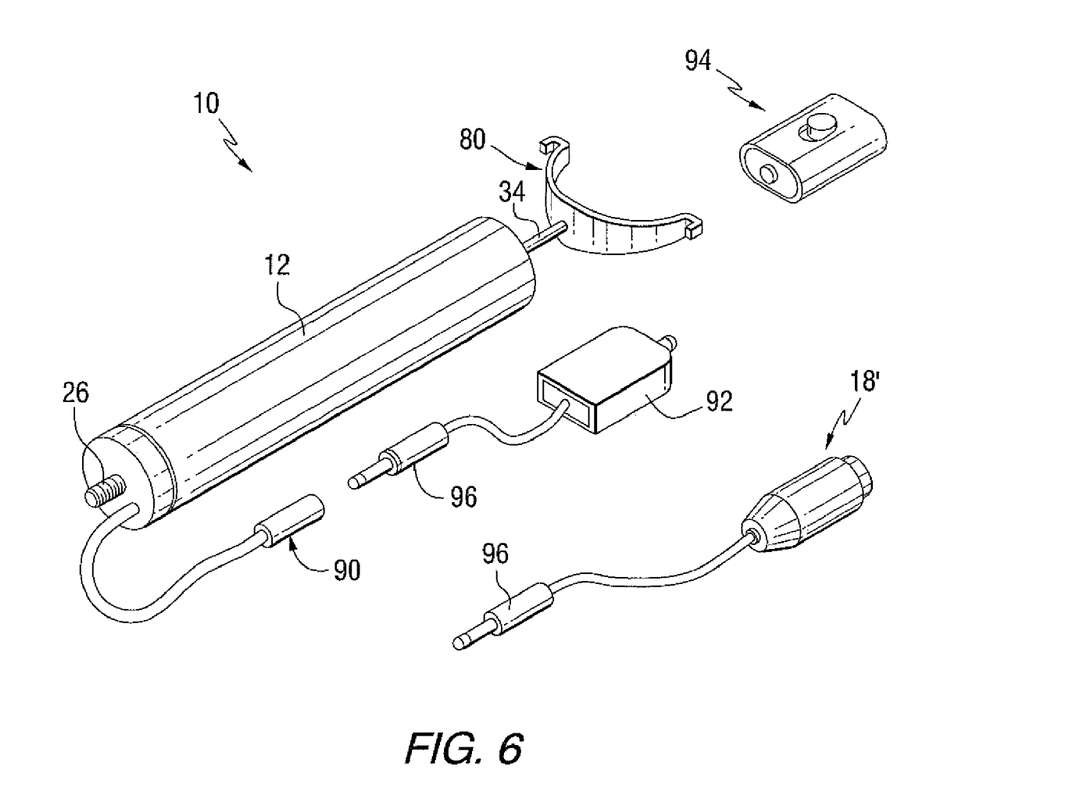
FIG. 6 is an isometric view of an embodiment of the game call assembly having an interchangeable wired switch and wireless switch.

In a particular embodiment shown in FIG. 6, the game call assembly 10 (or 100) includes a modified wired switch 18' that is electrically connected to the controller 20 via a switch connector 90. The switch connector 90 extends from the housing 12 so that the connector is easily accessible. The switch 18' is interchangeable with a wireless receiver 92 that cooperates with a wireless remote switch 94. The wireless remote may be operated to emit a wireless signal, such as infrared or radio. Upon detection of the signal, the wireless receiver actuates the motor 16 via controller 20. Each of the wired switch 18' and the wireless receiver 92 includes a bayonet 96 or other type of connector that cooperates with the switch connector 90 to place the wired switch 18' or the wireless receiver 92 in electrical communication with the controller 20. Thus, the user has the option of using the wired switch or the wireless switch according to the user's convenience.

In the embodiment shown, housing 12 is described as having a first housing feature 26 configured for engaging mating threaded bores 28 of one or more weighted sections 24 and/or threaded socket 42 of bow 40. It is to be understood, however, that the present invention can be alternately and variously configured by interchanging threaded sockets with studs, and vice versa, so long as the various sections and components are able to engage and be coupled together as described.

In the embodiment shown, game call assembly 10 is coupled to a weapon via an intervening weight section 30. However, it is to be understood each of game call assemblies 10 and 100 are configured to be directly coupled to and/or received within the sockets of various weapons without requiring the use of the intervening weighted sections.

In the embodiment shown, motor 16 is configured as an electrical motor, such as, for example, a direct current motor, stepper motor, or other similar motor, which when energized is configured to rotate shaft 34 thereof in a predetermined direction. However, it is to be understood that the present invention can be alternately configured with a different type of motor, such as, for example, a spring-driven motor or pneumatic-driven motor. In the former, a user winds or tensions a spring. Actuation of switch 18 releases the spring tension which is transformed into rotational movement of the motor shaft. In the latter, a source of pressurized air, such as, for example, a carbon dioxide cartridge, air provided (i.e., blown) by a user, or other source, is supplied and provides the force to rotate the shaft.

In the embodiment shown, controller 20 is configured as an electronic controller. It is to be understood, however, that the present invention can be alternately configured with a different type of controller, such as, for example, a mechanical resettable stop, ratchet stop, other suitable means that limits rotation of the shaft. As one skilled in the art will appreciate, the type of motor and/or actuation means used is considered when selecting which type of controller is to be used.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

The invention claimed is:

1. A game call assembly, comprising:
   a game call operable to emit a call by reorienting the game call from an upright position to an inverted position;
   a motor having a shaft, said motor rotating said shaft when energized, said game call coupled to said shaft;
   a game call mounting bracket that is attached to and rotatable with said shaft;
   a power source for energizing said motor;
   a housing, said motor and power source being disposed within said housing, said housing configured for mounting to an object; and
   a switch selectively electrically connecting said power source and said motor.

2. The game call assembly of claim 1, said game call mounting bracket having a curved shape and hooks for strapping said game call to said game call mounting bracket.

3. The game call assembly of claim 1, further comprising at least one weight section configured for being associated with said housing.

4. The game call assembly of claim 1, wherein said housing includes a first housing feature configured for engaging either of a corresponding feature of one or more weight sections to thereby couple said weight section to said housing and an accessory-mounting feature of a second object; wherein said switch is configured for mounting on said second object such that said switch is actuable by a user when in a ready-to-fire position.

5. The game call assembly of claim 1, said switch comprising a switch connector, a wired switch, and a wireless receiver; the wired switch and wireless receiver being interchangeably connected to the switch connector; the wireless receiver cooperating with a wireless remote switch.

6. The game call assembly of claim 1, the switch comprising a wireless receiver and a wireless remote switch, the wireless remote switch being operable to emit a wireless signal, the wireless receiver being operable to electrically connect said power source and said motor upon receipt of the wireless signal.

7. The game call assembly of claim 1, further comprising a controller controlling the amount by which said shaft is rotated to a predetermined amount for each actuation of said switch.

8. The game call assembly of claim 7, wherein said predetermined amount is equal to approximately 180 degrees.

9. The game call assembly of claim 1, wherein said game call comprises a modified estrus or can-type bleat call.

10. A game call assembly, comprising:
   a game call configured for emitting a call when inverted;
   a motor having a shaft, said motor rotating said shaft when energized, said game call coupled to said shaft;
   a power source for energizing said motor;

a switch selectively electrically connecting said power source and said motor;

a housing, at least one of said motor and power source being disposed within said housing, said housing configured for mounting to an object; and at least one weight section configured for being associated with said housing;

wherein each said at least one weight section includes a first and a second weight-section feature, said first weight-section feature for coupling said section to one of said housing and a second weight-section feature of another weight section, said second weight-section feature for coupling said section to said first weight-section feature of another weight section.

11. The game call assembly of claim 10, wherein said first weight-section feature comprises one of a threaded stud and a threaded socket, said second weight-section feature comprises the other of a threaded stud and a threaded socket.

12. A weapon assembly, comprising:

a weapon having an accessory-mounting feature; and a game call assembly coupled to said weapon via said accessory-mounting feature, said game call assembly including a game call configured for emitting a call when inverted, a motor having a shaft, said motor rotating said shaft when energized, said game call coupled to said shaft, a power source for energizing said motor, and a switch selectively electrically connecting said power source and said motor;

wherein said switch is configured for mounting on said weapon such that said switch is actuable by a user when in a ready-to-fire position.

13. A game call assembly, comprising:

means for emitting a game call, the game call intended to attract animals, said means for emitting a game call emitting the game call in response to motion of the means for emitting a game call;

means for imparting motion to the means for emitting a game call;

actuation means for actuating the means for imparting motion;

means for coupling the game call assembly to a second object; and means for stabilizing the second object.

14. The game call assembly of claim 13, further comprising at least one of control means and limiting means for ensuring a desired amount of movement is imparted to the means for emitting a game call upon each actuation thereof.

15. The game call assembly of claim 13, wherein the means for imparting motion comprises a rotatable shaft and a game call mounting bracket that is attached to and rotatable with the rotatable shaft.

16. The game call assembly of claim 15, said game call mounting bracket having a curved shape and hooks for strapping the means for emitting a game call to said game call mounting bracket.

\* \* \* \* \*